(No Model.)
W. L. SWAN.
STEAM AND WATER COOKER.
No. 539,925. Patented May 28, 1895.
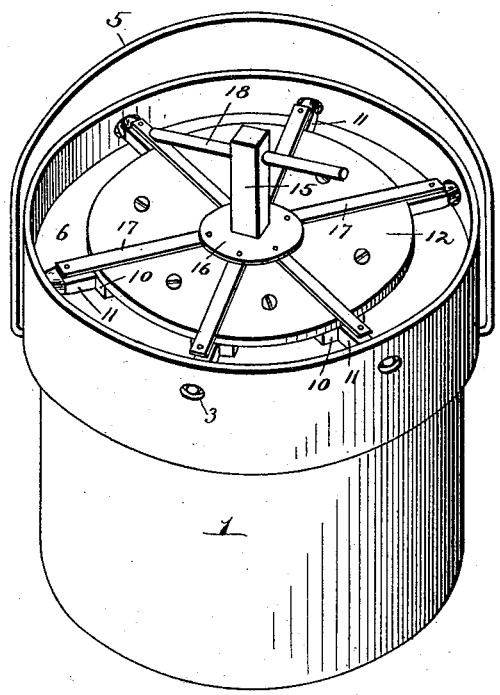
FIG. 1.
FIG. 2.
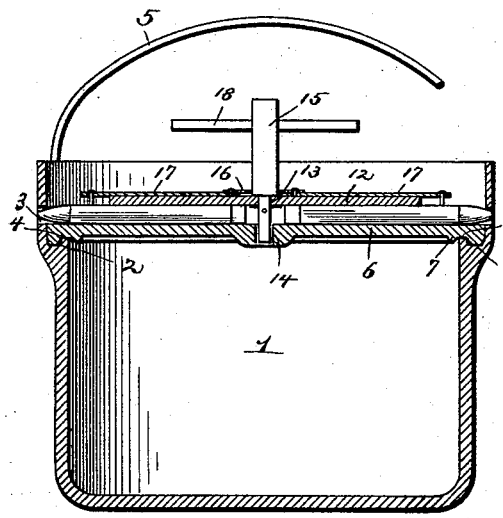
FIG. 3.
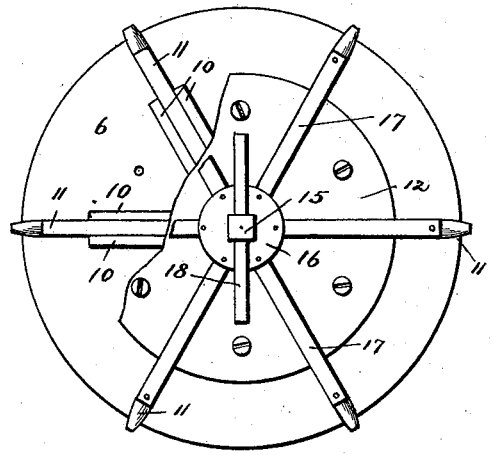
Witnesses
Harry L. Amer.
Inventor
William L. Swan.
By his Attorneys,
C. A. Snow & Co.

UNITED STATES PATENT OFFICE.

WILLIAM L. SWAN, OF MARSHALLTOWN, IOWA.

STEAM AND WATER COOKER.

SPECIFICATION forming part of Letters Patent No. 539,925, dated May 28, 1895.

Application filed December 1, 1893. Serial No. 492,489. (No model.)

*To all whom it may concern:*

Be it known that I, WILLIAM L. SWAN, a citizen of the United States, residing at Marshalltown, in the county of Marshall and State of Iowa, have invented a new and useful Steam and Water Cooker, of which the following is a specification.

My invention relates to an improvement in cooking utensils of the class known as boilers, and it has for its object to provide a boiler in which the water will be assisted in the operation of cooking by steam which is confined and superheated, whereby the pressure will cause the steam to permeate the articles in the cooker and expedite and improve the operation.

My invention consists in a cooking vessel provided with a steam tight lid capable of being applied and removed at will and adapted to carry suitable attachments such as a steam gage, exhaust cock and safety valve, to enable the operator to note the progress of the operation, and relieve the pressure when it reaches an intensity sufficient for the proper cooking of the articles under treatment.

Various other objects and advantages of my invention will appear in the following description, and the novel features thereof will be particularly pointed out in the claim.

In the drawings, Figure 1 is a perspective view of a utensil embodying my invention. Fig. 2 is a vertical central section of the same. Fig. 3 is a plan view, partly broken away, of the lid.

Similar numerals of reference indicate corresponding parts in all the figures of the drawings.

1 designates the pot or kettle, which may be of any preferred form or construction, so far as the body portion thereof is concerned, and integral with its sides, adjacent to the upper edge thereof, is an off-set vertical rim, 2, provided with spaced openings, 3. The shoulder or off-set portion, 4, of this rim, or the horizontal portion whereby the vertical portion is connected to the sides of the pot or kettle, is arranged below the plane of the upper edge of the pot to form a groove or channel surrounding the upper edge of the vessel.

5 represents the ordinary handle or bail.

The lid, 6, corresponds in shape to the plan of the vessel and is adapted to rest upon the upper edge of the same with its periphery in contact with the inner surface of the upstanding rim, 2; the under surface of said lid being provided with concentric ribs, 7 and 8, between which is formed an annular groove or depression, 9, to receive and fit the upper edge of the vessel, whereby the said ribs bear respectively against the inner and outer surfaces of the vessel. Formed upon or secured to the upper surface of this lid is a series of radially disposed pairs of webs, 10, the members of each pair being arranged parallel with each other to form intervening parallel sided guide-ways in which are slidably fitted the radially movable bolts, 11, provided with tapered outer extremities to engage the openings in the rim of the vessel. Resting upon, and firmly secured to, the webs is a false cover or circular plate, 12, of less diameter than the lid, and this stationary disk 12 has a central opening, 13, which registers with a socket, 14, in the lid, to receive the vertical spindle, 15. This spindle is provided with a reduced round portion to engage said opening and socket, and an angular upper portion upon which is fitted the disk, 16, to which are connected the inner ends of the links, 17. The reduced portion of the spindle is secured in the socket of the cover by a movable fastening device arranged adjacent to the lower face of the stationary disk 12. Said links are pivotally connected at their outer extremities to the bolts. A cross-bar or handle, 18, is fitted in a transverse perforation in the spindle. The lid may be and preferably is provided with a steam-pressure gage, a safety-valve, and an exhaust cock, all of the ordinary or any preferred construction, but as such features form no part of my invention, illustration and particular description are unnecessary.

In operation, the lid is placed within the upstanding rim upon the upper edge of the vessel and the spindle is turned, thereby projecting the bolts outward and engaging their tapered extremities in the openings of said rim. Said tapered extremities, by binding against the upper sides of the openings, force the lid firmly to its seat and thus a steam tight joint is formed between the vessel and its lid. Furthermore, it will be seen that the outer depending lip 8, which fits within the channel between the upper edge of the vessel proper and the inner surface of the upstanding rim, constitutes a water-seal, the water being supplied by condensation upon the adjacent exterior surfaces of the vessel.

Various changes in the form, proportion and minor details of construction may be resorted to without departing from the spirit or sacrificing the advantages of the invention.

Having thus described my invention, I claim—

The combination of a vessel provided on its interior below its upper edge with an annular shoulder, and having a bail, a cover supported upon said shoulder of the vessel and located below the upper edges thereof and provided on its upper face with a central socket, and having radial webs arranged in pairs and extending outward from the central socket and terminating short of the periphery of the cover, a disk mounted upon the radial ribs and terminating short of the periphery of the cover and having a central opening, a series of radial bolts slidingly arranged between the radial ribs and adapted to engage the vessel above the supporting shoulder, a vertical spindle having a reduced lower portion fitting in the opening of the stationary disk and the socket of the cover and detachably secured to the stationary disk by a fastening device located on the lower face of the same, an actuating disk fixed to the vertical spindle and located slightly above the stationary disk, and the series of connecting links arranged flat upon the upper face of the stationary disk and extended beyond the same and having their outer terminals pivoted to the sliding bolts, the inner ends of the links being located between the movable disk and the stationary one, and pivoted to the former, substantially as and for the purpose described.

In testimony that I claim the foregoing as my own I have hereto affixed my signature in the presence of two witnesses.

WILLIAM L. SWAN.

Witnesses:
OBED CASWELL,
RACHEL MALONE.